United States Patent
Hampshire et al.

(10) Patent No.: US 8,132,641 B2
(45) Date of Patent: Mar. 13, 2012

(54) SEISMIC WAVE GENERATING APPARATUS AND METHOD

(75) Inventors: John B. Hampshire, Irvine, CA (US); Brock Hemmingsen, Tega Cay, SC (US); Mike Douglas, Waxhaw, NC (US)

(73) Assignee: Neos, Inc., Newport Beach, CA (US)

( * ) Notice: Subject to any disclaimer, the term of this patent is extended or adjusted under 35 U.S.C. 154(b) by 0 days.

(21) Appl. No.: 12/669,398

(22) PCT Filed: Jul. 18, 2008

(86) PCT No.: PCT/US2008/070391
§ 371 (c)(1),
(2), (4) Date: Mar. 17, 2010

(87) PCT Pub. No.: WO2009/012424
PCT Pub. Date: Jan. 22, 2009

(65) Prior Publication Data
US 2011/0011668 A1    Jan. 20, 2011

Related U.S. Application Data

(60) Provisional application No. 60/950,840, filed on Jul. 19, 2007, provisional application No. 60/970,327, filed on Sep. 6, 2007.

(51) Int. Cl.
*G01V 1/02* (2006.01)
*G01V 1/04* (2006.01)
*G01V 1/00* (2006.01)

(52) U.S. Cl. .................................. 181/113; 181/121

(58) Field of Classification Search .................. 181/113, 181/121, 106, 105, 114; 166/249, 177.6
See application file for complete search history.

(56) References Cited

U.S. PATENT DOCUMENTS

| | | | | |
|---|---|---|---|---|
| 3,302,744 A | * | 2/1967 | Lemm | 181/121 |
| 3,416,632 A | * | 12/1968 | Bodine, Jr. | 181/121 |
| 3,642,090 A | * | 2/1972 | Bennett | 181/121 |
| 3,810,524 A | * | 5/1974 | Dransfield | 181/119 |
| 3,951,229 A | * | 4/1976 | Dransfield | 181/114 |

(Continued)

FOREIGN PATENT DOCUMENTS

GB    2067289 A  *  7/1981

(Continued)

OTHER PUBLICATIONS

International Preliminary Report on Patentability and Written Opinion of the International Searching Authority, PCT/US2008/070391, Jan. 28, 2010.

*Primary Examiner* — Edgardo San Martin
(74) *Attorney, Agent, or Firm* — Stoel Rives LLP

(57) ABSTRACT

A seismic wave generating device and methods for generating seismic waves having a relatively strong longitudinal energy and a relatively weak transverse energy are disclosed. A device may have a hollow casing and a striking member passing through the hollow casing, the striking member or the hollow casing bearing a spacing member. A method may drive the hollow casing into the earth, then remove earth from within the hollow casing. The method may place a striking member through the hollow casing and may drive the striking member further into the earth to create seismic waves with a relatively strong longitudinal energy and a relatively weak transverse energy.

20 Claims, 8 Drawing Sheets

U.S. PATENT DOCUMENTS

| | | | | |
|---|---|---|---|---|
| 4,004,651 A | * | 1/1977 | Dransfield | 181/117 |
| 4,007,803 A | * | 2/1977 | Airhart | 181/117 |
| 4,100,991 A | * | 7/1978 | Airhart | 181/117 |
| 4,106,586 A | * | 8/1978 | Stafford | 181/121 |
| 4,147,228 A | * | 4/1979 | Bouyoucos | 181/119 |
| 4,342,364 A | * | 8/1982 | Bodine | 166/249 |
| 4,388,981 A | * | 6/1983 | Fair | 181/119 |
| 4,400,980 A | * | 8/1983 | Lepert | 73/579 |
| 4,484,657 A | * | 11/1984 | Barta | 181/121 |
| 4,505,362 A | * | 3/1985 | Layotte et al. | 188/67 |
| 4,673,037 A | * | 6/1987 | Bodine | 166/249 |
| 4,674,591 A | * | 6/1987 | Vogen | 181/108 |
| 4,700,804 A | * | 10/1987 | Trudeau | 181/121 |
| 4,715,471 A | * | 12/1987 | Fulkerson et al. | 181/121 |
| 4,749,057 A | * | 6/1988 | Anstey | 181/121 |
| 4,799,572 A | * | 1/1989 | Airhart | 181/114 |
| 4,991,685 A | | 2/1991 | Airhart | |
| 5,000,285 A | | 3/1991 | Airhart | |
| 5,270,985 A | * | 12/1993 | Thomas et al. | 367/142 |
| 5,309,405 A | * | 5/1994 | Brett et al. | 367/36 |
| 5,401,919 A | * | 3/1995 | Crowell et al. | 181/121 |
| 5,458,204 A | * | 10/1995 | Tunkers | 173/49 |
| 5,582,247 A | * | 12/1996 | Brett et al. | 166/249 |
| 5,666,328 A | * | 9/1997 | Crowell et al. | 367/189 |
| 5,727,639 A | * | 3/1998 | Jeter | 173/132 |
| 5,992,559 A | * | 11/1999 | Ballard, Jr. | 181/0.5 |
| 6,338,394 B1 | * | 1/2002 | Meynier | 181/113 |
| 7,066,250 B2 | * | 6/2006 | Webb et al. | 166/177.6 |
| 7,178,626 B2 | * | 2/2007 | Matherne et al. | 181/121 |
| 7,284,636 B2 | * | 10/2007 | Vedders | 181/121 |

FOREIGN PATENT DOCUMENTS

| | | |
|---|---|---|
| KR | 10-00332431 A | 4/2002 |
| WO | WO 2009012422 A2 * | 1/2009 |

* cited by examiner

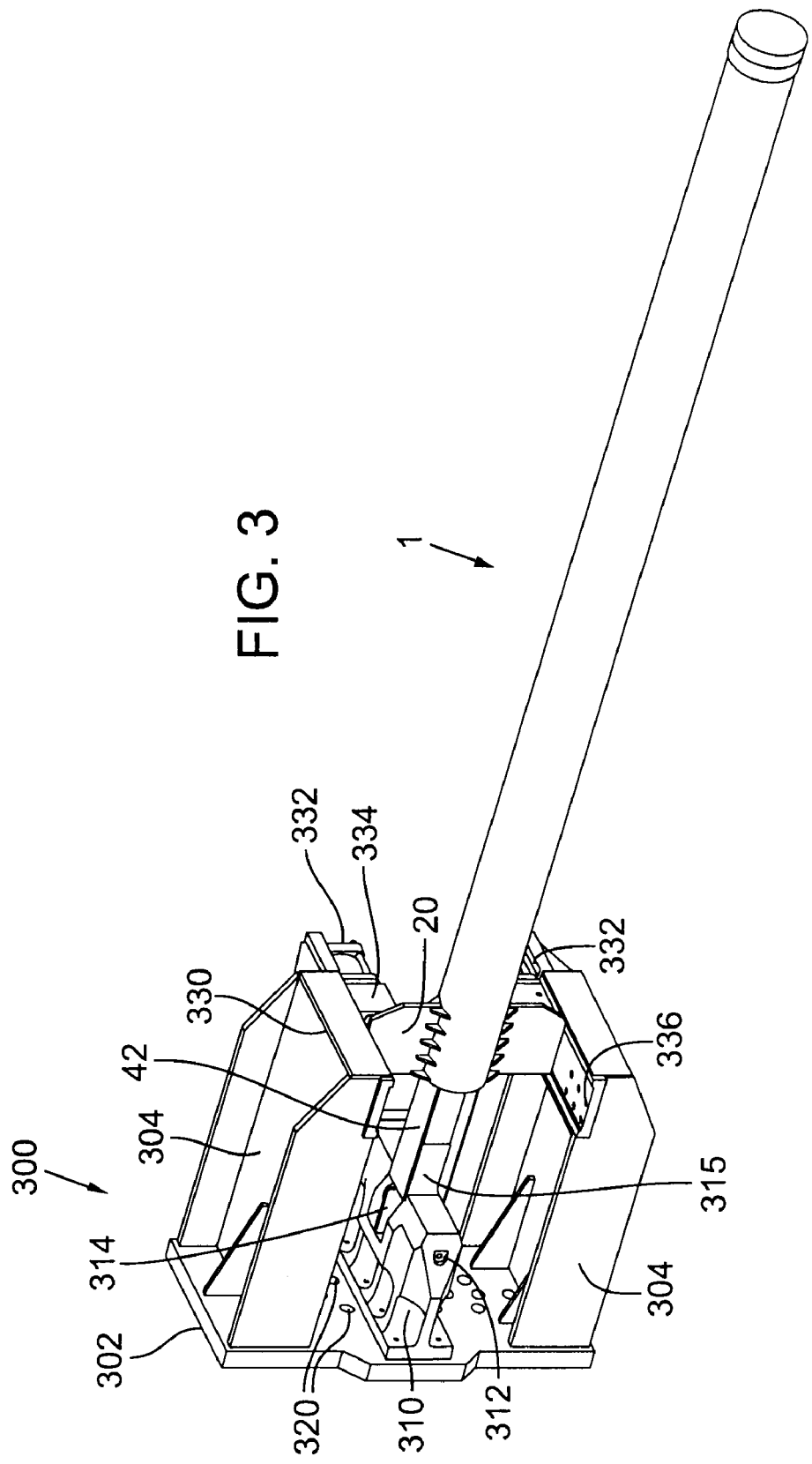

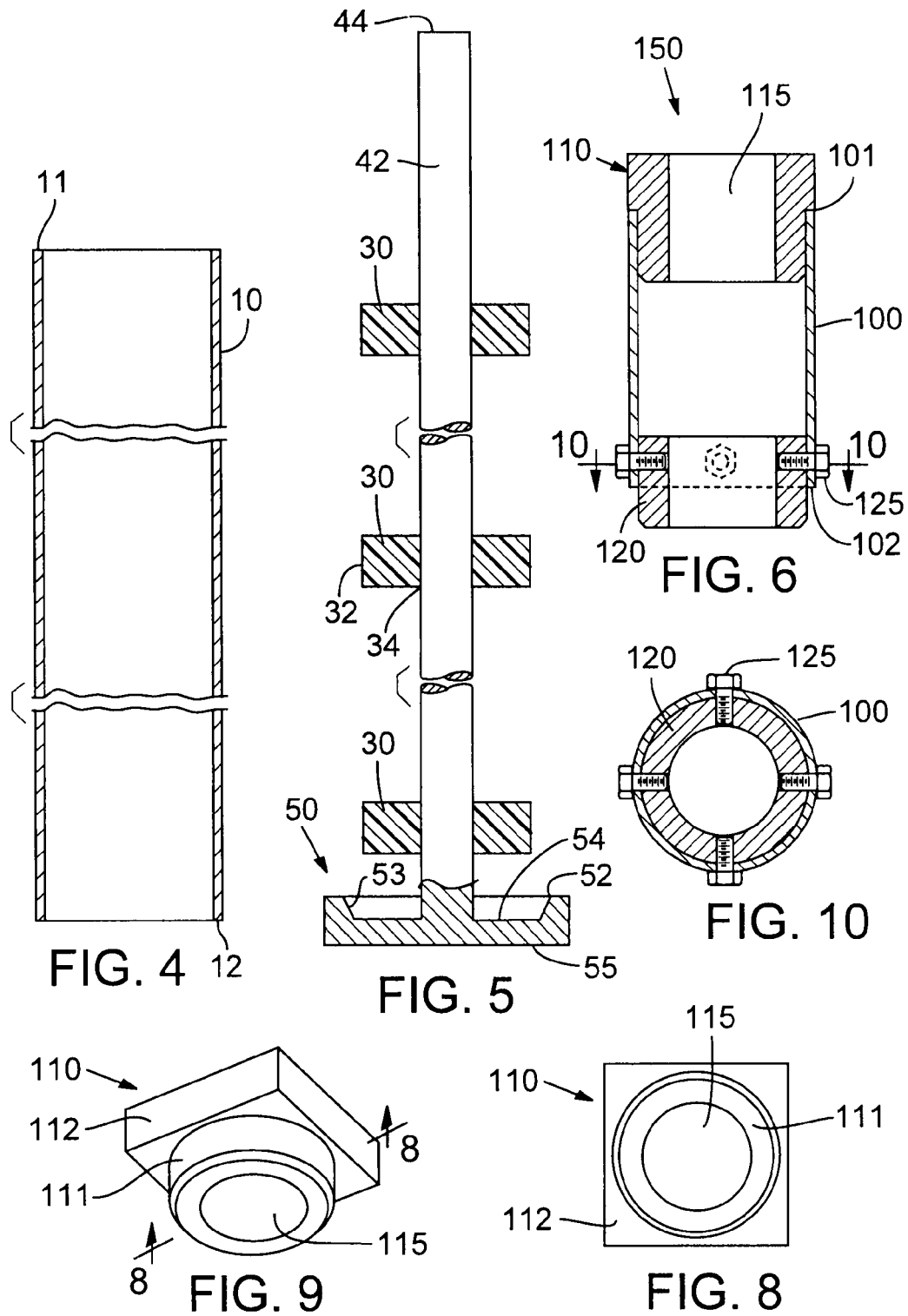

SEISMIC WAVE GENERATING APPARATUS AND METHOD

RELATED APPLICATIONS

This application claims priority to PCT/US2008/070391, titled Seismic Wave Generating Apparatus and Method and filed on Jul. 18, 2008, U.S. Provisional Patent Application No. 60/950,840, titled Seismic Wave Generating Apparatus and Method and filed on Jul. 19, 2007, and to U.S. Provisional Patent Application No. 60/970,327, titled Seismic Wave Generating Apparatus and Method and filed on Sep. 6, 2007, which are all incorporated by reference herein.

TECHNICAL FIELD

The field of the present disclosure relates to devices and methods for generating seismic waves.

BACKGROUND

One use for seismic waves generated by machinery is to image and characterize subterranean structures. Subterranean structures reflect seismic waves, and the reflected seismic waves are detected by machinery for analysis. The inventors have recognized that longitudinal seismic waves generated by machinery travel substantially perpendicular to the earth's surface. The inventors have also recognized that subterranean structures reflect longitudinal seismic waves and in the reflection process convert a substantial portion of the longitudinal seismic waves into transverse seismic waves. The inventors have also recognized that transverse seismic waves travel substantially non-perpendicular to the earth's surface.

The inventors have recognized that conventional seismic wave generators generate transverse and longitudinal seismic waves. Longitudinal seismic waves are frequently referred to as primary waves, or p-waves. Longitudinal waves are primarily compression waves that cause motion of the medium the waves travel through in the direction of wave propagation. Transverse seismic waves are frequently referred to as secondary waves, shear waves, or s-waves. Transverse waves primarily cause motion of the medium the waves travel through in a direction perpendicular to the direction of wave propagation. The inventors also recognized that transverse seismic waves from a seismic wave generator may make it difficult for a seismologist analyzing the reflected seismic returns from the earth, which may include transverse seismic waves, to distinguish transverse waves generated by the seismic source from transverse waves reflected by subterranean structures of potential interest.

Conventional devices for generating seismic waves are generally a detonated explosive charge or gun fired into the bottom of a borehole, a vibroseis vehicle, or a conventional piling driven into the ground. While the conventional devices generally create seismic waves penetrating into the ground, the inventors have recognized numerous drawbacks for imaging subterranean structures using conventional devices. For example, it may be difficult to control the longitudinal and transverse seismic energies created by explosives, guns or vibroseis vehicles. Another example the inventors recognized is that explosives and guns may destroy the mechanical interface between the seismic generator and the earth, thus limiting their use to once or twice at a particular site. Another example is that vibroseis vehicles may not improve the mechanical interface between the transducer plate and the earth, which may make it difficult to propagate energy into the ground.

The inventors have recognized that a conventional piling, such as a pipe or solid rod, may transmit relatively substantial transverse waves when the piling is driven into the ground. The inventors recognized that transverse waves may substantially result from mechanical shear forces created at the interface between the piling sides and the earth as the piling is driven into the ground. Transverse waves may also substantially result from compression waves that are created as a piling is driven into the ground. As noted earlier, transverse waves emanating from a seismic wave source may make subterranean imaging, characterization or analysis difficult and imprecise if a seismologist analyzing the seismic returns from the earth has difficulty distinguishing transverse waves generated by the seismic source from transverse waves reflected by subterranean structures of potential interest.

Thus, the present inventors have recognized the need for a seismic wave generating source that creates seismic waves having a relatively strong longitudinal energy and relatively weak transverse energy.

SUMMARY OF THE DISCLOSURE

The present invention is directed to methods and apparatuses for generating seismic waves. Certain embodiments disclose a seismic wave generating apparatus that includes a striking member passing through a hollow casing, and having at least one isolating member which substantially contacts the striking member and the casing to maintain the striking member and the casing in a spaced relation to one another. Other disclosed embodiments describe a method for using a seismic wave generating apparatus to create seismic waves with relatively strong longitudinal energy and relatively weak transverse energy.

Additional aspects and advantages will be apparent from the following detailed description of illustrated embodiments, which proceeds with reference to the accompanying drawings.

BRIEF DESCRIPTION OF THE DRAWINGS

Preferred embodiments are illustrated by way of example, and not by way of limitation in the figures of the accompanying drawings in which like reference numerals refer to similar elements and in which:

FIG. 3 is an orthogonal view of a carriage used with a conventional vibrational pile driver and the embodiment of FIG. 1.

FIG. 4 is a front cross-sectional view of a second embodiment casing.

FIG. 5 is a front cross-sectional view of a striking member used with the embodiment of FIG. 4.

FIG. 6 is a front cross-sectional view of a driving device used with the embodiment of FIG. 4.

FIG. 8 is a bottom view of a driving cap used with the driving device of FIG. 7.

FIG. 9 is a bottom perspective view of the driving cap of FIG. 8.

FIG. 10 is a top cross-sectional view of the driving device of FIG. 7.

DETAILED DESCRIPTION OF PREFERRED EMBODIMENTS

The following discussion is illustrative and intended to describe preferred embodiments and is not intended to limit the present invention to the embodiments discussed. Various embodiments may have numerous applications where a seismic wave generator is employed, and may be scaled and adapted to many applications.

Figures 1, 2:
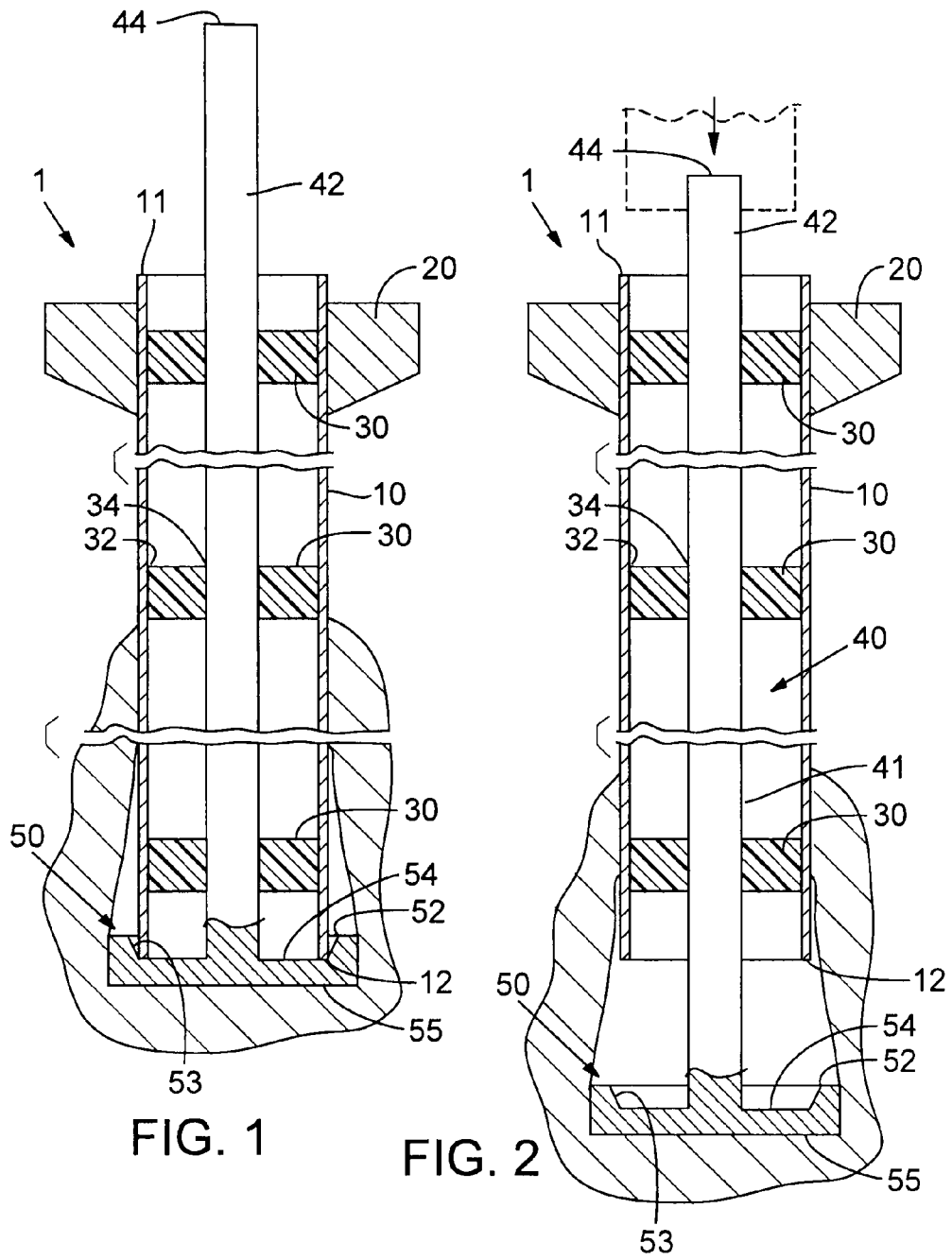
FIG. 1 is a front cross-sectional view of one embodiment.
FIG. 2 is a front cross-sectional view of the embodiment of FIG. 1 showing a striking member deployed from a casing.

FIG. 1 illustrates an improved seismic wave generator 1 according to a first embodiment. A hollow casing 10 is formed from a segment of standard steel pipe used for pilings. For example, the hollow casing 10 preferably has a length of about 20 feet and a diameter of about 12½ inches. The length and diameter for casing 10 may be adjusted to account for many factors such as soil type, driving depth and desired striking member 40 second end 50 size, among others. The particular cross sectional shape of hollow casing 10 may be formed from any combination of lines and curves and may include polygons such as squares and rectangles, for example. The sidewalls of hollow casing 10 may be straight, but do not need to be. The described embodiments, as well as other embodiments, may solve certain problems related to generating seismic waves with relatively strong longitudinal energy and relatively weak transverse energy as discussed below.

The hollow casing 10 has spacing members 30 located inside. Spacing members 30 are preferably made from a flexible material, such as the exemplary materials described below, but may also be made from rigid materials such as wood or metal. When the spacing member 30 is made from a flexible material, the spacing member 30 may provide both spacing and energy damping or absorption. Spacing members 30 are positioned where they will keep the hollow casing 10 and the striking member 40 in a spaced relation to one another. In the illustrated embodiment, the spaced relation prevents shaft 42 from contacting hollow casing 10. In other embodiments, the spaced relation may permit contact between shaft 42 and hollow casing 10.

Spacing members 30 may be attached to the hollow casing 10, for example, by bolting or adhesives. One manner for attaching a spacing member 30 to the hollow casing 10 may be to drill and tap a set of holes in spacing member 30, then drill a matching set of holes in hollow casing 10. Spacing member 30 may then be lowered through hollow casing 10 to the location of the set of holes in hollow casing 10. Spacing member 30 may then be rotated to align the set of holes on spacing member 30 with the set of holes in hollow casing 10. Once the two sets of holes are aligned, bolts may be passed through the holes in hollow casing 10 and threaded into the tapped holes in spacing member 30.

In other embodiments, spacing members 30 are not attached to the hollow casing 10. For example, the hollow casing 10 may have a set of holes drilled into the sidewall to permit two rigid bars, made from steel for example, to pass through hollow casing 10 and form a "shelf," (not shown). The two bars may be spaced to permit a shaft 42 to pass between the bars without contacting either bar. A spacing member 30 may be located inside hollow casing 10 so it rests on the two bars. Another set of holes and two additional bars may then be added on the side of spacing member 30 opposite the side resting on the original two bars. The two additional bars may be spaced to permit the shaft 42 to pass between the bars without contacting either bar and may cooperate with the original two bars to substantially keep spacing member 30 in place. Other suitable structures and manners for retaining spacing members 30 in place may be implemented. Placing a spacing member 30 into hollow casing 10 may also be a function of the cross sectional shape of hollow casing 10 and whether the sidewalls of hollow casing 10 are straight or not.

In a preferred configuration, the spacing members 30 are attached to the shaft 42 of the striking member 40, for example by bolting or adhesive. The striking member 40 is constructed from a length of "H" beam. Spacing members 30 have a cut-out center which substantially matches the "H" beam cross section. To assemble, each spacing member 30 is placed on the shaft 42 and slid into position. A spacing member 30 may be held in place by a set of nuts and bolts secured onto the shaft 42 above and below the spacing member 30. Alternatively, the spacing member 30 may have one or more bolt apertures drilled into it to permit one or more bolts to pass through the spacing member 30 (not shown). Apertures drilled into the shaft 42 may be positioned so that bolt apertures in spacing member 30 align with the apertures in shaft 42. Bolts may then be passed through the bolt apertures in spacing member 30 and the aligned apertures in shaft 42 and secured in place with a nut. In other embodiments, a spacing member 30 may be slid into position on shaft 42 and an adhesive used to fill the space between the shaft 42 and the spacing member 30. The spacing member 30 may be clamped or otherwise held in place while the adhesive dries or cures.

Figure 17:
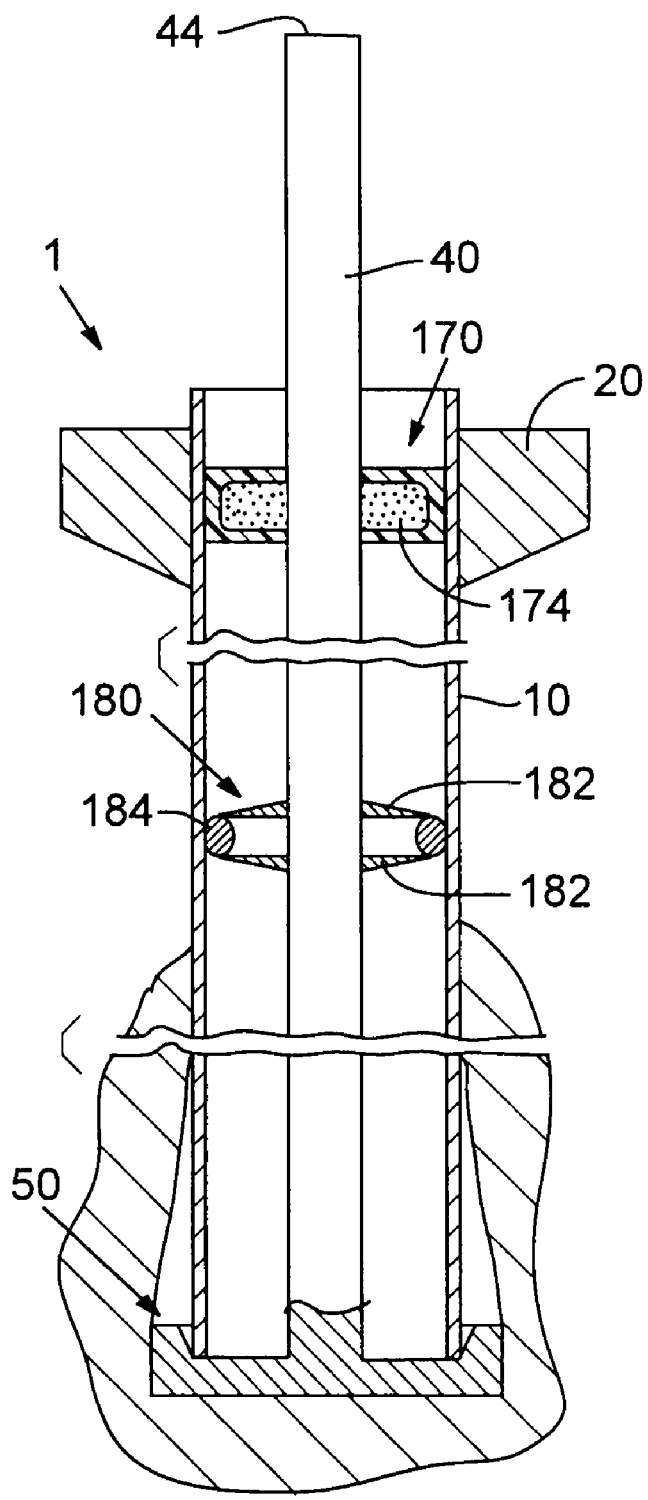
FIG. 17 is a front cross sectional view showing various spacers that are also vibration dampers.

In the illustrated embodiment, spacing members 30 may be made from an elastomeric material, for example, natural or synthetic rubber. Other flexible materials, such as, but not limited to, foam and plastics, may be used to provide spacing, as well as vibrational damping, between striking member 40 and hollow casing 10 as well. However, vibrational damping is not necessary for all embodiments. Referring to FIG. 17, the spacing members 170 may also be made from an elastomeric material 172 with a hollow interior filled with a high viscosity fluid 174, such as oil for example. Other embodiments may utilize an expandable foam or other similar material to fill the space between striking member 40 and the hollow casing 10 as a spacing member 30. Yet other embodiments may utilize wood or metal as the material for spacing member 30. Still other embodiments may utilize roller bearings oriented to roll axially along casing 10 for spacing member 30. Referring to FIG. 17, for example, roller bearings having rubber rollers 184 on sealed bearing (not shown) may be attached to shaft 42 using arms 182 and oriented to roll along the inside of casing 10 as shaft 42 moves through casing 10. Other materials and components may be used for spacing members 30.

In other embodiments, a low friction material is placed between the sliding interface between spacing members 30 and casing 10. Depending upon how spacing members 30 are held in place, the sliding interface may be at either interface 32 or 34. For example, if spacing member 30 is attached to shaft 42, a low friction material, for example nylon, polyethylene (including ultra high molecular weight polyethylene), or other suitable material, may be inserted as a sleeve within casing 10 so spacing member 30 contacts the sleeve (not shown). If the spacing member 30 is attached to shaft 42, another example is to attach, for example by bolting or adhesion, a strip of low friction material on the surface of spacing member 30 that faces the sidewalls of casing 10. If the spacing member 30 is attached to the shaft 42, another example is to apply a thin layer of grease on the surface of spacing member 30 that faces the sidewalls of casing 10, or to apply a thin layer of grease to the interior of casing 10. If spacing member 30 is attached to casing 10, an example is to attach a low friction material on the surface of spacing member 30 that faces shaft 42. If spacing member 30 is attached to casing 10, another example is to apply a thin layer of grease between spacing member 30 and shaft 42. Other suitable low friction materials and manners for placing low friction materials at either sliding interface 32 or 34 may be used. Thus, a slidable spaced relationship may be maintained between the casing 10 and the shaft 42 of the striking member 40.

Preferably, a striking member 40 passes through the hollow casing 10. The striking member 40 has a shaft 42 which is preferably formed from a steel "H" beam, for example. Shaft 42 may also be formed from other shapes, for example, but not limited to, an "I" beam, hollow pipe, or solid rod. Steel and steel alloys are the preferred materials for shaft 42, but other tough, durable materials may be used.

In the illustrated embodiment, striking member 40 has a first end 44 protruding beyond the first end 11 of casing 10. Preferably, when the striking member second end 50 contacts the second end 12 of casing 10, the distance first end 44 protrudes past the first end 11 of the casing 10 substantially defines the operating distance for generating seismic waves with a relatively strong longitudinal energy and relatively weak transverse energy. For example, the first end 44 of striking member 40 preferably protrudes four feet beyond the first end 11 of the hollow casing 10. The distance the first end 44 of striking member 40 protrudes past the first end 11 of the casing 10 may depend upon how much potential separation between the second end 50 of the striking member 40 and the second end 12 of the casing 10 is desired. The more separation between the second end 50 of the striking member 40 and the second end 12 of the casing 10 that is desired, the farther the first end 44 of striking member 40 may protrude past the first end 11 of the housing 10.

In the illustrated embodiment, the striking member 40 is driven into the ground by a conventional vibrating pile driver or by a conventional impact pile driver. The terms "driven" and "struck" are used interchangeably, and each term encompasses the other unless specified otherwise. For example, the first end 44 of the striking member 40 may be impacted by a conventional impact pile driver. Preferably, the striking member 40 may be made with a rigid material and shaped, for example as an "H" beam, "I" beam, solid rod or hollow pipe, which minimizes deformation of the first end 44. Alternatively, a pile driving cap may be formed into or modified to mate securely on the first end 44 of the striking member 40.

In other embodiments, the first end 44 of striking member 40 may be gripped by a conventional vibrating pile driver. The vibrating pile driver may then be used to drive the striking member 40 into the ground.

In the illustrated embodiment, driving flanges 20 are attached to the hollow casing 10 near the hollow casing first end 11. Driving flanges 20 may be, for example, sheet steel plates welded or bolted to hollow casing 10. The driving flanges 20 are preferably shaped so that they can be gripped by a carriage 300 (FIG. 3) attached to a conventional vibrational pile driver. In the illustrated embodiment, a conventional pile driver uses a carriage (for example, but not limited to, the one illustrated in FIG. 3) to grip driving flanges 20 and is used to drive casing 10 into the ground, along with the striking member 40 as discussed below.

As shown in FIGS. 1-2, the second end 50 of the striking member 40 contacts the earth on a front side 55. The second end 50 may be formed integrally with striking member 40, as a result of casting or forging, for example, or is preferably a metal plate welded or bolted to shaft 42. The shape, size and material of the second end 50 may vary depending upon the seismic waves desired, soil conditions or other factors. In certain embodiments, the second end 50 has a diameter matching the outer diameter of casing 10. In other embodiments the second end 50 has a diameter greater than the outer diameter of casing 10. In yet other embodiments, the second end 50 has a diameter less than the inner diameter of casing 10, but the second end 50, or the casing 10, is equipped with sufficient structure to prevent shaft 42 from being withdrawn through casing 10. Other suitable casing engaging structures that prevent the second end 50 from passing through the casing 10 may also be used.

The backside 54 of second end 50 preferably engages the second end 12 of the hollow casing 10. In the illustrated embodiment depicted in FIG. 1, a flange 52 may be attached to the second end 50. Flange 52 may be configured to engage the hollow casing 10 about the second end 12, and may have a tapered wall 53 or a straight wall 53 (not shown) to assist centering the second end 50 about the second end 12 of the casing 10. In other embodiments, the backside 54 of second end 50 is conically shaped instead of the flat shape shown in FIGS. 1-2, the conical shape assisting with centering the second end 50 about the second end 12 of the casing 10. Other embodiments may have a casing engaging structure that does not have a flange or other centering device, or may have a different centering device from those described.

Referring to FIG. 3, a preferred carriage 300 for driving a seismic wave generator 1 with a vibrational pile driver is described. An exemplary vibrational pile driver is described in U.S. Pat. No. 5,458,204, which is incorporated herein by reference. The carriage 300 comprises a base 302 with apertures 320 for connecting the base 302 to a vibrational pile driver. Arms 304 extend from the base 302 and are rigidly attached to the base 302, for example by welding or bolting.

A clamp assembly 330 may be attached to each end of arms 304 distal from base 302. Preferably each clamp assembly 330 comprises a moveable jaw 334 that may be driven by a hydraulic or other actuator 332 to grip flanges 20 on seismic wave generator 1 when seismic wave generator 1 is driven into the earth as described below. In the illustrated embodiment, two opposing, moveable jaws 334 press on the large, flat surfaces of each flange 20 to grip seismic wave generator 1. Note that two actuators 332 are illustrated in FIG. 3 and two actuators 332 were removed for clarity. The two non-illustrated actuators 332 are preferably attached to clamp assembly 330 using apertures 336. In alternate embodiments, two stops, for example a solid block of metal, (not illustrated) may be used in place of the two non-illustrated actuators 332. The arms 304 and clamp assemblies 330 are preferably spaced so there is clearance between flanges 20 and clamp assemblies 330 when the moveable jaws 334 are not gripping flanges 20.

A shaft clamp 310 may be attached to base 302, for example by bolting or welding. The shaft clamp 310 preferably has a pair of grippers 314 driven by an actuator 312, for example, hydraulic or a mechanical worm gear. Grippers 314 may grip shaft 42 when the carriage is used to drive seismic wave generator 1 into the earth as described below. Preferably, grippers 314 grip the shaft 42 when the striking member 40 is driven into the ground as described below.

Referring to FIGS. 1 and 2, a preferred method for generating seismic waves is described. The seismic wave generator 1 is placed at a desired position on the earth's surface (not shown). Preferably, the casing 10 is substantially vertical with respect to the earth's surface. The carriage 300 (FIG. 3) is inserted into a conventional vibrating pile driver, then the carriage 300 grips at least driving flanges 20. Operating the conventional vibrating pile driver causes sufficient downward force on casing 10 to push casing 10 into the second end 50 of the striking member 40, thus driving the entire seismic wave generator 1 into the earth as illustrated in FIG. 1.

In the preferred method, after the seismic wave generator 1 has been driven sufficiently far into the earth, for example to remain upright or to compact the soil contacting the front side 55 of the second end 50, the carriage 300 (FIG. 3) is released from driving flanges 20. For example, determining when the seismic wave generator 1 has been driven sufficiently far to compact the soil is to observe how far the seismic wave generator 1 moves in response to an applied force. The rate at which the seismic apparatus 1 is driven into the earth can be observed, and when the rate drops to one-half the starting rate, for example, the soil may be sufficiently compacted for certain embodiments. Determining whether the soil contacting front side 55 may be sufficiently compacted depends upon factors such as soil type, moisture and the type of testing performed. Another preferred manner for determining whether the soil contacting front side 55 may be well compacted is to observe when the seismic wave generator 1 does not sink more than 50 millimeters (approximately 2 inches) for every 13,500 newton meters (approximately 10,000 foot-pounds) of applied energy. The rate change method and the distance per force applied method may be used interchangeably with either vibrational or impact pile drivers, or other driving devices. Other suitable methods and tests may be used for determining when sufficient driving may be reached. For example, but not limited to, driving may be sufficient when the seismic generator 1 remains upright in the earth on its own.

Compacting the soil underneath the front side 55 of the second end 50 may improve the mechanical interface between the second end 50 and the earth. The mechanical interface may be improved as relatively loose soil is broken down and forced together by the pile driver. Tightly compacted soil should be a better energy transmission medium than loosely packed soil, and may result in better seismic wave propagation away from front side 55. When a vibrational pile driver is used, for example, compacting the soil underneath front side 55 may create better impedance for the typical 5-35 Hertz vibrations from the vibrational pile driver transmitted through second end 50. Better impedance may result in more energy transferred into the earth's crust.

In certain embodiments, the carriage 300 (FIG. 3) is removed from the vibrational pile driver (not shown) and the vibrational pile driver is connected to the striking member 40. For example, the vibrational pile driver may grip the first end 44 of the shaft 42 using a standard hydraulic gripper. The grippers 314 grip the shaft 42 about gripper reinforcement plates 315, and moveable jaws 334 release flanges 20. The gripper reinforcement plates 315 may be constructed as steel plates welded to the shaft 42 and may be provided to prevent shaft 42 from wearing when a vibrational pile driver is operated. Operating the vibrational pile driver drives the striking member 40 second end 50 further into the earth away from hollow casing 10, which remains substantially in place. The second end 50 of the striking member 40 is driven into the earth until the second end 50 no longer contacts the second end 12 of the hollow casing 10.

Referring to FIG. 2, once the second end 50 stops contacting the hollow casing 10, seismic waves with relatively strong longitudinal energy and relatively weak transverse energy may be created. At this point, the second end 50 may contact compacted soil via front side 55. The longitudinal sides 41 of shaft 42 predominantly contact the spacing members 30. In other words, there is little, if any, contact between the longitudinal sides 41 of the shaft 42 and the earth. When striking member 40 is driven further into the earth, there is little, if any, interface where mechanical shear forces may be transmitted from the shaft 42 to the earth, which may lessen the transverse energy for generated seismic waves.

In preferred embodiments, the connection between the casing 10 and the striking member 40 is preferably via spacing members 30. In the preferred method, spacing members 30 substantially prevent vibrations from being transmitted from the shaft 42 to the hollow casing 10. The shaft 42 is substantially vibrationally isolated from the casing 10, and thus from the earth. Vibrationally isolating the shaft 42 from the casing 10, and thus from the earth contacting casing 10, may lessen the transverse energy transmitted from striking member 40 to the earth. When the striking member 40 is driven further into the earth, there is little, if any, vibration transmitted from the shaft 42 to the earth via casing 10, which may lessen the transverse energy for generated seismic waves.

The spacing member 30 may also provide damping that reduces or substantially prevents rebound of the second end 50 of the striking member 40. For example, when the end 44 of the striking member 40 is struck, or driven, the spacing member 30 may provide damping that reduces or substantially prevents the second end 50 from "bouncing" off the earth, which may cause a second or other unintended impact.

When operation of the seismic wave generator 1 is completed, the vibrational pile driver, preferably gripping the first end 44 of shaft 42, is operated to withdraw the striking member 40 from the ground. As the striking member 40 is withdrawn, the second end 50 preferably interacts with the second end 12 of the casing 10 resulting in the entire seismic wave generator 1 being pulled from the ground. In other methods, the casing 10 may be withdrawn from the ground before withdrawing the striking member 40.

FIGS. 4-6 illustrate a seismic wave generator according to another embodiment. The seismic wave generator is substantially similar to the seismic wave generator 1 (FIG. 1). The differences reside mostly in that the seismic wave generator lacks driving flanges 20, and is used with a driving device (FIG. 6). The preferred driving device 150, may fit onto the first end 11 of casing 10 and may be releasably attached to casing 10. For example, the first end 11 of casing 10 may contain female threads while the driving device 150 may have matching male threads (not shown), or the driving device 150 may be bolted onto casing 10 (not shown). Or, the driving device 150 may be configured to fit securely on casing 10 and use friction to hold driving device 150 in place (as illustrated).

The preferred driving device 150 has a length from the second end 102 of housing 100 to the top of driving cap 110 that is greater than the portion of shaft 42 protruding from the first end 11 of casing 10. The driving device 150 thus protects shaft 42 from impacts generated by an impact pile driver. Protecting shaft 42 may keep the second end 50 substantially in contact with the second end 12 of casing 10 when the seismic wave generator is driven into the earth.

The driving cap 110 preferably has an aperture 115 through the center. The aperture 115 may permit the first end 44 of the shaft 42 to pass therethrough, thus providing a visual indication that the driving device 150 is not resting upon the first end 44 of shaft 42. Preferably, the first end 44 of the shaft 42 does not protrude all the way through the aperture 115.

Driving device 150 is preferably made from cast or forged steel, or other tough, durable material, to withstand repeated impacts, for example, of 13,500 newton meters (approximately 10,000 foot-pounds) or more. Driving device 150 may employ a cast steel bottom end bushing 120 with an outside diameter that is slightly smaller than the inside diameter of the casing 10. Bushing 120 may be attached to housing 100. For example, the bushing 120 may be attached to the driving device 150 by several high-strength bolts 125, or the driving device 150 may be welded to the driving device housing 100. The driving device housing 100 is preferably made of the same material as the casing 10, but may be any tough, durable material.

Generating seismic waves with relatively strong longitudinal energy and relatively weak transverse energy using the embodiment depicted in FIGS. 4-6 is now described. The seismic wave generator is placed at a desired location on the earth's surface with the driving device 150 in place. An impact pile driver is positioned to impact the driving device 150 and drive the seismic wave generator into the earth. Once the seismic wave generator has been driven sufficiently far into the earth, the driving device 150 is removed and striking member 40 is impacted to separate second end 50 from the second end 12 of casing 10. In preferred embodiments, a striking cap, for example similar to the striking cap 110 in FIG. 9 but with a closed top so the striking cap sits on shaft 42, is placed on the end 44 of shaft 42. The interior of aperture 115 (FIG. 9) may be formed to substantially match the cross section of shaft 42. In other embodiments the striking cap may be provided with a flange and bolted to shaft 42, or otherwise suitably attached to shaft 42.

Seismic waves with relatively strong longitudinal energy and relatively weak transverse energy may be created by impacting an impact pile driver on the striking member 40, or a striking or driving cap (for example, as described below) on striking member 40, once the second end 50 is substantially separated from the second end 12 of casing 10. The seismic wave generator is withdrawn from the ground in a manner similar to how the seismic wave generator 1 is withdrawn.

Figures 11, 12:
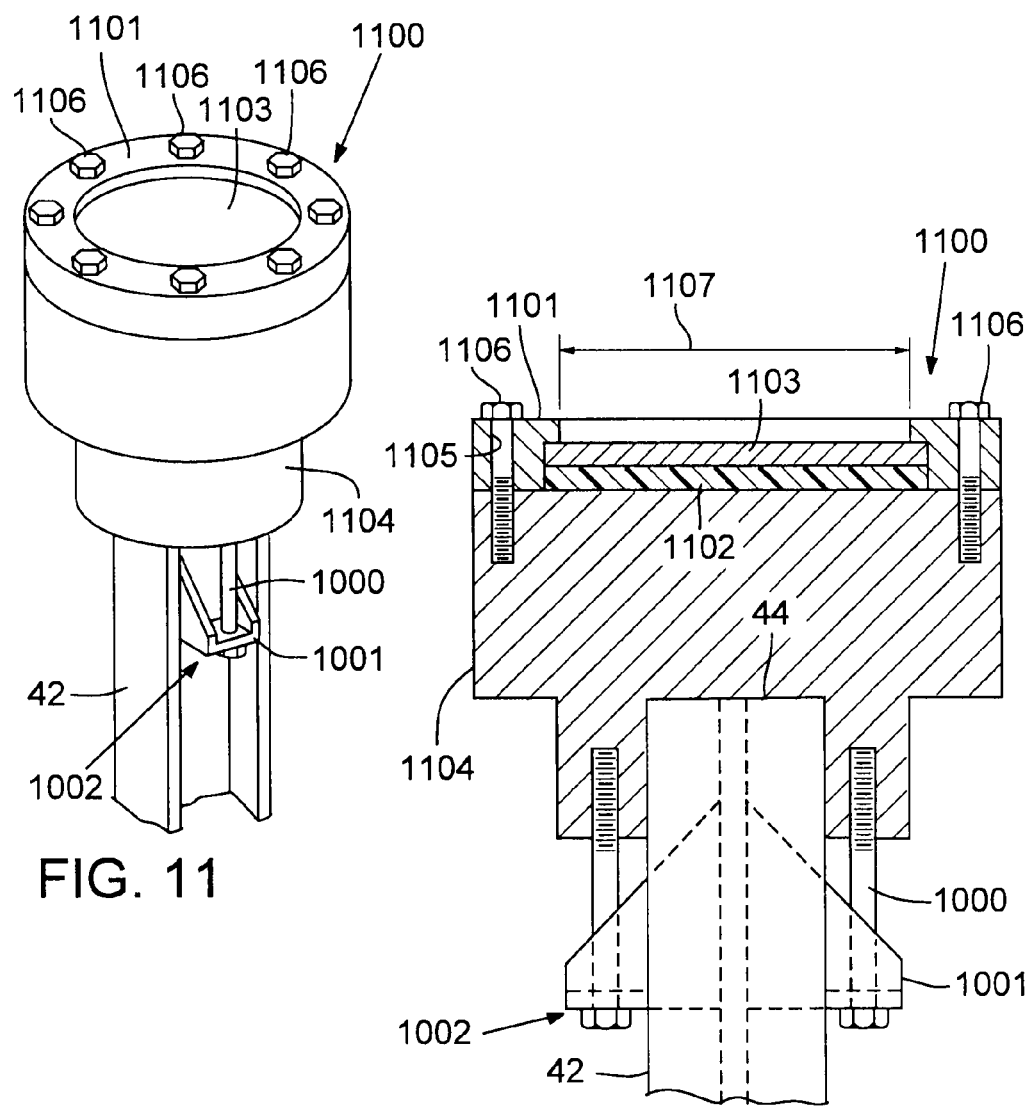
FIG. 11 is a top perspective view of a driving cap.
FIG. 12 is a cross-sectional view of the driving cap of FIG. 11.
Figure 13:
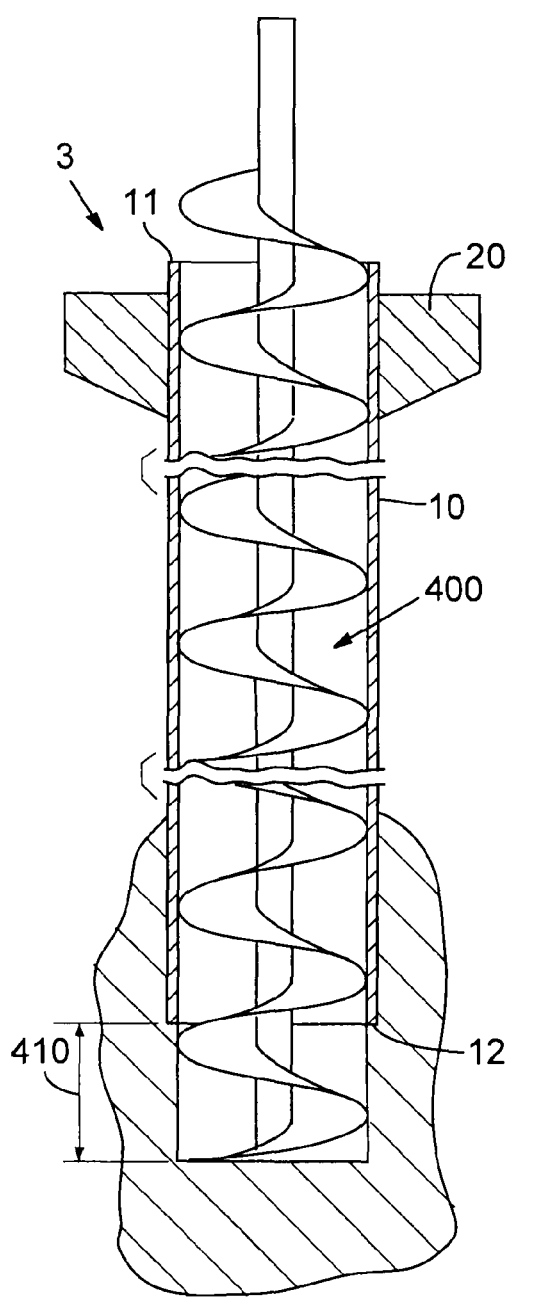
FIG. 13 is a front cross-sectional view of another embodiment.
Figure 14:
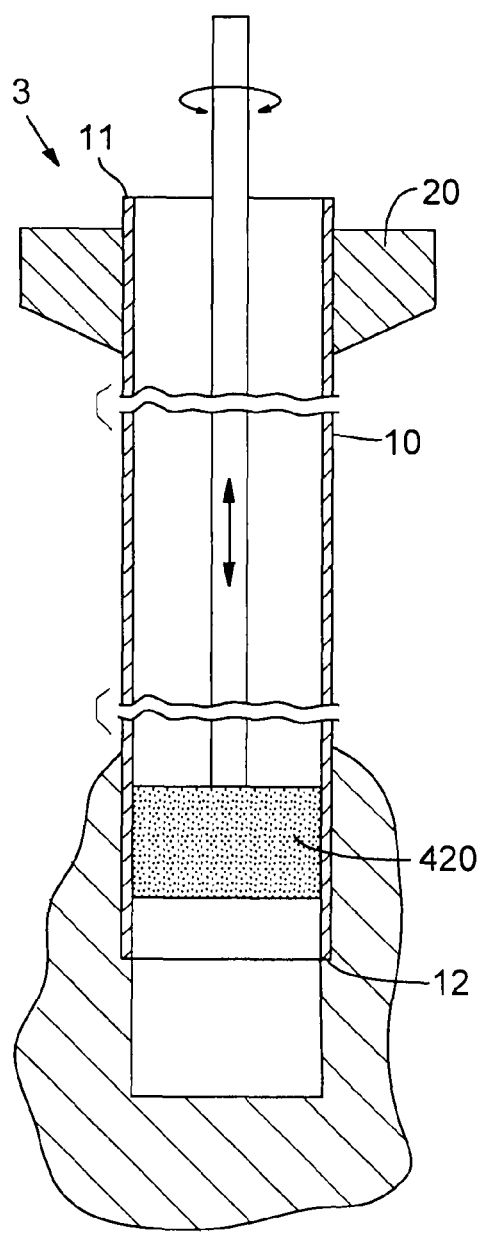
FIG. 14 is a front cross-sectional view of the embodiment of FIG. 13 illustrating an interior being swept.
Figure 15:
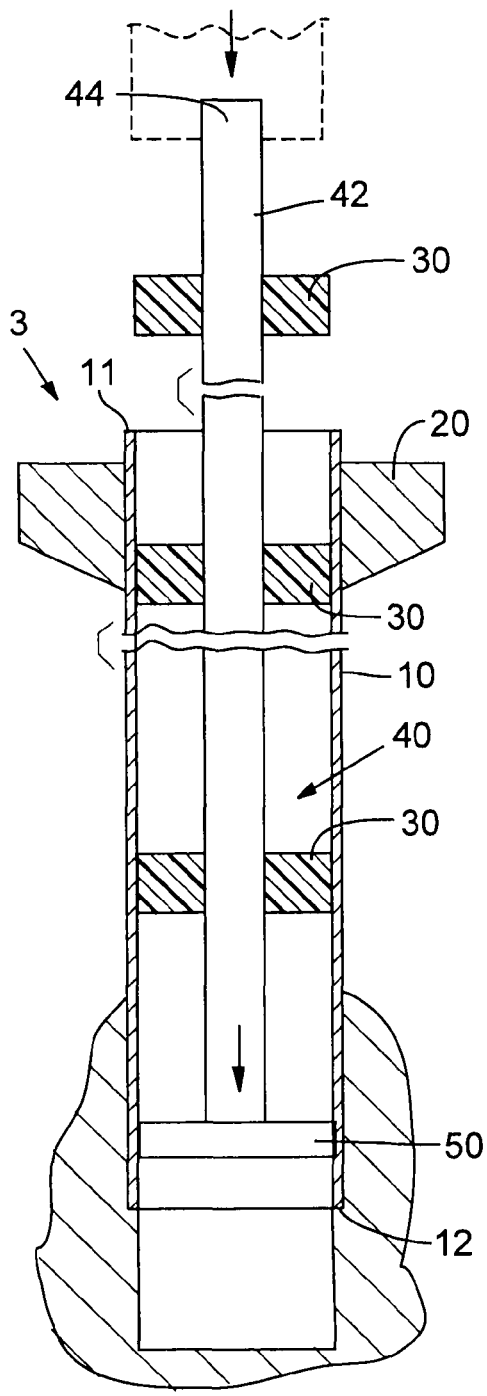
FIG. 15 is a front cross-sectional view of the embodiment of FIG. 13 illustrating a striking member being lowered.
Figure 16:
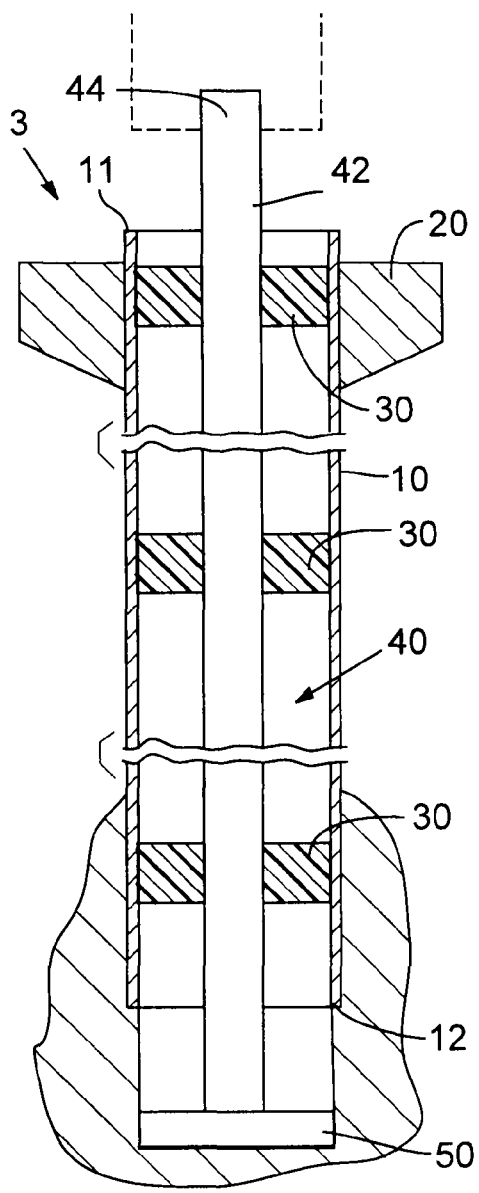
FIG. 16 is a front cross-sectional view of the embodiment of FIG. 13 illustrating a striking member in place for generating seismic waves with relatively strong longitudinal energy and relatively weak transverse energy.

Referring to FIGS. 11 and 12, another embodiment includes a driving cap 1100 that may be rigidly attached to shaft 42 at end 44. Bolts 1000 pass through brackets 1001 and may be threaded into the cap body 1104. Optional lock washers (not shown) placed between the bolt head and the bracket 1001 may help hold the bolts 1000 in place. The cap body 1104 may be drawn tightly against shaft 42 (illustrated in this embodiment with an H-beam cross section) by the force of the bolts 1000 and brackets 1001. The brackets 1001 may be attached to shaft 42 by welding or other suitable manner. The brackets 1001 are preferably located sufficiently far from the first end 44 to permit the gripper reinforcement plates 315 (FIG. 3) to be gripped by grippers 314 on carriage 300.

Preferably, an H-shaped recess is cut or cast into cap body 1104 and the recess fits over the first end 44 of shaft 42. The shaft 42 and cap body 1104 may then be fixed together rigidly by the combination of bolts 1000, locking washers (not shown), and brackets 1001. Cap body 1104 may be crowned by a relatively soft disk 1102, for example, made of ½-inch thick blue nylon, and a relatively hard disk 1103, for example, made of ½-inch thick aluminum (preferably a 6061 alloy). Other thicknesses and suitable materials may be used.

The relatively soft disk 1102 and the relatively hard disk 1103 may be rigidly attached to cap body 1104 by clamping ring 1101. In an alternative configuration, the clamping ring 1101 may be configured as a flange with bolt holes 1105 drilled through it. Bolts 1106 with optional lock washers (not shown) may secure clamping ring 1101 to the cap body 1104 (via threaded holes within the cap body 1104), and thus secure the relatively soft disk 1102 and the relatively hard disk 1103 to the cap body 1104.

An impact pile driver's hammer head (not shown) may have a diameter that is substantially smaller than the inside diameter 1107 of clamping ring 1101. When the hammer head strikes disks 1102 and 1103, the disks 1102 and 1103 may deform which may prevent the cap body 1104 from becoming cracked or otherwise damaged by the force of repeated hammer impacts. The deformation of disks 1102 and 1103 may also serve to secure the disks 1102 more rigidly between cap body 1104 and clamping ring 1101. Rigidly affixing discs 1102 and 1103 to cap body 1104, combined with clamping by bolts 1000 and brackets 1001, may create a rigid structure substantially free from rattling. When the driving cap 1100 is struck by the hammer, virtually all of the force from each impact may be transmitted to the second end 50 of striking member 40, and relatively little energy may be dissipated by rattling driving cap 1100 on the first end 44 of striking member 40. Rattling between driving cap 1100 and shaft 42 may introduce undesirable acoustic components into the generated seismic waves that may make analysis of seismic echoes from subterranean structures more difficult. A lack of rattling may therefore enhance generating seismic waves with relatively strong longitudinal energy and relatively weak transverse energy emanating from the second end 50 of striking member 40 when driving cap 1100 is struck.

FIGS. 7-10 illustrate a driving device 200 according to another embodiment. A seismic wave generator substantially similar to the seismic wave generator described above is utilized with the driving device 200.

In operation, the driving device 200 is lowered over the striking member 40 until the driving device 200 mates with the top of the hollow casing 10. The driving device 200 may have a cast steel bottom end bushing 120 with an outside diameter that is slightly smaller than the inside diameter of the casing 10. The bushing 120 is preferably rigidly attached to housing 100. For example, the bushing 120 may be attached to the driving device 200 by several high-strength bolts 125, or the bushing 120 may be welded to the driving fixture housing 100.

Figure 7:
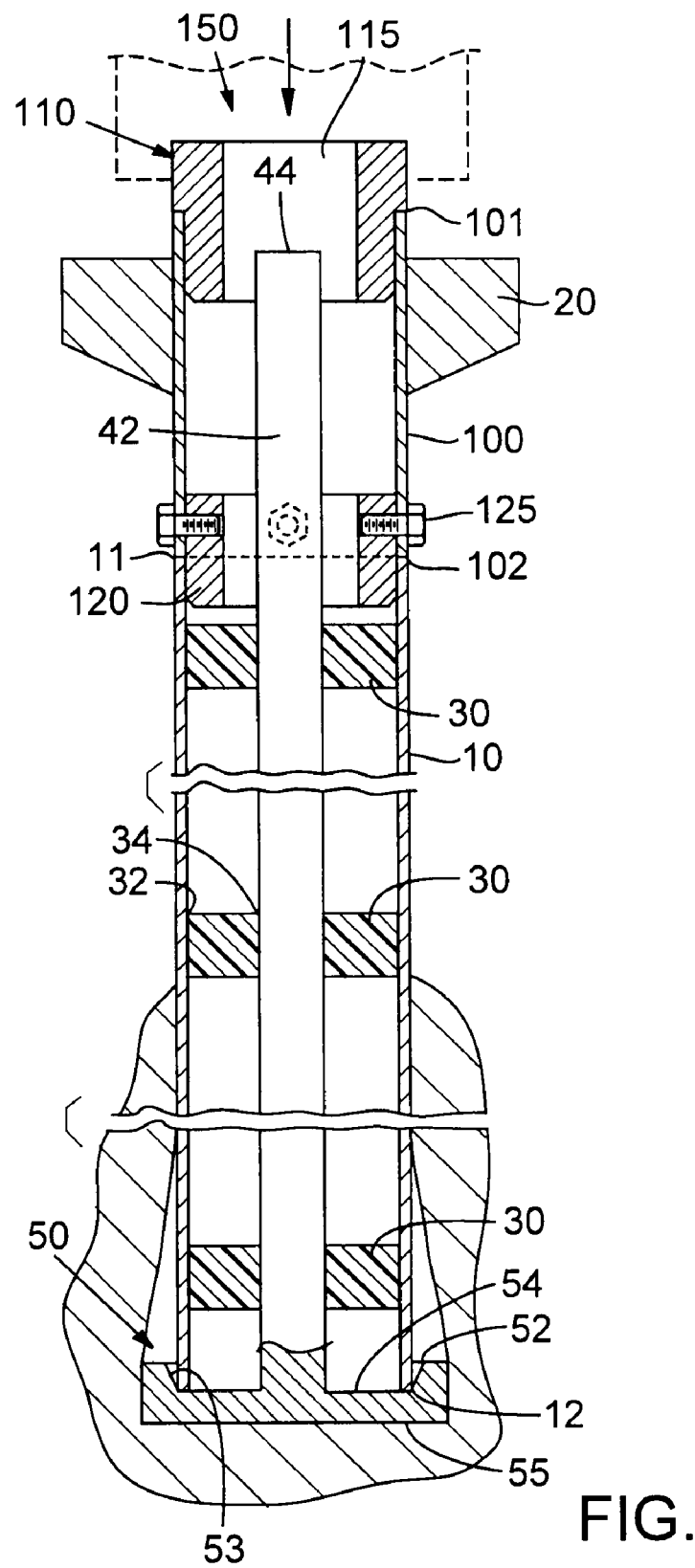
FIG. 7 is a front cross-sectional view of a driving device used with another illustrated embodiment.

As illustrated in FIGS. 7 and 10, the driving device 200 is configured such that the bushing 120 does not bear substantial impact from a pile driver. Instead, the driving force may be substantially transmitted from the housing 100 to casing 10 while the bushing 120 keeps the housing 100 and casing 10 aligned. The driving device housing 100 is preferably made of the same material as the casing 10, but may be any tough, durable material.

The driving device 200 is preferably constructed with a heat-treated, cast or forged steel cap 110 set into the top of the driving device housing 100. Referring to FIGS. 8-9, the cap 110 may have a generally square impacting portion 112, a generally circular portion 111 sized to fit within housing 100 and an aperture 115 for visual confirmation that the driving device 200 is not resting on shaft 42. The driving cap 110 may be configured to any suitable size and shape. Driving device 200 also has driving flanges 20 rigidly attached to the driving fixture housing 100, for example by bolting or welding. Driving device 200 is therefore designed for use with both vibrational and impact pile drivers to drive the casing 10 and the striking member 40 into the earth together.

The length of the driving fixture housing 100 is preferably greater than the distance that the shaft 42 protrudes above the first end 11 of the casing 10 when the second end 50 contacts the second end 12 of casing 10. The driving device 200 may be driven by a vibrational pile driver or an impact pile driver. A vibrational pile driver typically uses a carriage, such as the one shown in FIG. 3, to grip driving flanges 20 attached to the driving device 200 to drive a seismic wave generator into the earth. An impact pile driver hammers cap 110 to drive a seismic wave generator into the earth.

Generating seismic waves with relatively strong longitudinal energy and relatively weak transverse energy using the embodiment depicted in FIGS. 7-10 is now described. A seismic wave generator is placed at a desired location on the earth's surface with the driving device 200 in place. An impact pile driver may be positioned to impact the driving device 200 and drive the seismic wave generator into the earth. Or, a vibrational pile driver, preferably using a carriage (FIG. 3), may grip the driving flanges 20 on driving device 200 and drive the seismic wave generator into the ground. Once the seismic wave generator has been driven sufficiently to a desired depth, the driving device 200 is removed and striking member 40 is driven into the earth, either by an impact pile driver or a vibrational pile driver, to separate second end 50 from the second end 12 of casing 10.

Seismic waves with relatively strong longitudinal energy and relatively weak transverse energy may be created by impacting an impact pile driver on the striking member 40, or by operating a vibrational pile driver on the striking member 40, once the second end 50 is substantially separated from the second end 12 of casing 10.

In certain embodiments, the casing 10 may be driven deeper into the ground, for example, to contact the striking member 40 second end 50, after seismic waves with a relatively strong longitudinal energy and relatively weak transverse energy have been created. Striking member 40 may be then driven deeper into the ground to separate second end 50 from casing 10, if needed. Seismic waves with relatively strong longitudinal energy and relatively weak transverse energy may again be created by impacting an impact pile driver on the striking member 40, or by operating a vibrational pile driver on the striking member 40, when second end 50 is substantially separated from the second end 12 of casing 10. Methods for creating seismic waves with a relatively strong longitudinal energy and relatively weak transverse energy at least a second time without withdrawing a seismic wave generator from the ground may be used other embodiments.

The seismic wave generator is withdrawn from the ground in a manner similar to how the seismic wave generator 1 is withdrawn when seismic wave generation is completed.

FIGS. 13-16 illustrate another embodiment for a driving device 3 and a method for using the driving device 3. A hollow casing 10 may be driven into the earth using a vibrational pile driver (not shown) and may have driving flanges 20 for the vibrational pile driver to grip. Alternatively, a hollow casing 10 may be driven into the earth using an impact pile driver (not shown) with or without a suitable pile driving cap such as the one illustrated in FIGS. 8-9.

The hollow casing 10 is driven to a desired depth, for example 10 to 15 feet. After the hollow casing 10 is driven to the desired depth, the column of earth contained within hollow casing 10 is removed, for example by using an auger drill 400.

Once the column of earth is removed from hollow casing 10, a drill, for example an auger drill 400, continues to drill, or is lowered through hollow casing 10 if a different implement is used to drill, below the second end 12 of casing 10 to create a drilled depth 410. In one embodiment the drilled depth 410 may be approximately 2 feet past the second end 12 of casing 10, however drilled depths 410 less than and greater than 2 feet may be used.

In other embodiments, a drill, such as auger drill 400, or other implement is used to remove a column of earth. A casing 10 may then be driven into the earth substantially where the column of earth was removed so that the casing 10 does not substantially fill with earth or other material as it is driven. For example, a 12 foot column of earth may be removed and the casing 10 may be driven 10 feet into where the column of earth was removed to leave a drilled depth 410 below the casing 10. Other column of earth lengths and depths for driving a casing 10, as well as other drilled depths 410, may be used. After driving, the casing 10 may be swept as described below.

Once the drill is removed from hollow casing 10, the inside of hollow casing 10 may be swept to substantially remove earth or other debris that may cling to the inside of hollow casing 10. For example, a brush 420, such as a chimney-sweeping brush or other brush suitable for cleaning the inside of a pipe, may be passed through hollow casing 10. After sweeping the inside of hollow casing 10, a thin layer of grease or other suitable lubricant or friction reducing material may be applied to the inside of hollow casing 10. In some embodiments the friction reducing material may be applied to the inside of the hollow casing 10 prior to driving the hollow casing 10 into the ground. For example, a layer of Teflon®, nylon, polyethylene, or other suitable material may be used. The friction reducing material may be applied to substantially all of the inside of hollow casing 10, or may be applied to an upper portion of hollow casing 10 (near the earth's surface), or otherwise may be applied to hollow casing 10 to assist passing a striking member 40 through hollow casing 10. In other embodiments a friction reducing material may be applied to spacing members 30 attached to the shaft 42 of the striking member 40, discussed below.

The striking member 40 including a second end 50 sized to fit within hollow casing 10 is then lowered through hollow casing 10, for example using a vibrational pile driver or a crane. In one embodiment, the second end 50 of striking member 40 may have an outer diameter that is slightly smaller than the inner diameter of hollow member 40, for example, so that the outer diameter of the second end 50 contacts the inner diameter of the hollow casing 10. The outer diameter of the second end 50 may be smaller.

The shaft 42 of the striking member 40 may be longer than the hollow casing 10 so that a portion of the shaft 42 protrudes beyond the first end 11 of the hollow casing 10 when the striking member 40 is used to generate seismic waves with relatively strong longitudinal energy and relatively weak transverse energy. In other embodiments, the shaft 42 may be longer than the hollow casing 10, but may have the first end 44 of shaft 42 drop into the hollow casing 10 when the striking member 40 is used to generate seismic waves with relatively strong longitudinal energy and relatively weak transverse energy. In yet other embodiments, the shaft 42 may be shorter than the hollow casing 10, for example, when an impact driver has a striking foot sized to fit within the hollow casing 10.

One or more spacing members 30 may be attached to shaft 42 as described above and may be sized to fit within hollow casing 10. Preferably, spacing members 30 are sized to contact the inner walls of hollow member 40. Other embodiments do not have spacing members 30. When spacing members 30 are present, they maintain a spaced relationship between shaft 42 and hollow casing 10 as described above.

The striking member 40 is preferably lowered through the hollow casing 10 so that the second end 50 of the striking member 40 protrudes past the second end 12 of the hollow casing 10. Preferably, the second end 50 of the striking member 40 rests in the drilled depth 410 and does not contact the second end 12 of the hollow casing 10.

An impact pile driver or vibrational pile driver may be used to drive the striking member 40 further into the earth thus creating seismic waves with relatively strong longitudinal energy and relatively weak transverse energy. The seismic wave generator illustrated in FIGS. 13-16 may be withdrawn from the earth, for example, by using a vibrational pile driver to withdraw the striking member 40, then using the vibrational pile driver to withdraw the hollow casing 10.

It will be obvious to those having skill in the art that many changes may be made to the details of the above-described embodiments without departing from the underlying principles of the invention. The scope of the present invention should, therefore, be determined only by the following claims.

The invention claimed is:

1. An apparatus for directionally generating seismic waves comprising:
    an elongate hollow casing having opposing first and second ends, the hollow casing substantially vertically oriented with respect to the surface of the earth and at least partially placed in the earth with the second end in the earth and the first end at or above the surface of the earth and without earth substantially within the hollow casing;
    a striking member including a shaft, a striking end at one end of the shaft, and an earth contacting end at the opposing end of the shaft, the shaft of the striking member extending through the elongate hollow casing such that the earth contacting end protrudes past the second end of the hollow casing and the striking end protrudes past the first end of the hollow casing without contacting the hollow casing, the earth contacting end of the striking member located proximate to the hollow casing second end, the shaft substantially prevented from contacting the earth by the hollow casing; and
    a spacing member positioned between the shaft of the striking member and the hollow casing, the spacing member maintaining the hollow casing and the shaft in a slidable spaced relation to each another.

2. The apparatus for directionally generating seismic waves according to claim 1, wherein the apparatus is constructed and arranged to generate seismic waves with a relatively strong longitudinal energy and a relatively weak transverse energy when the earth contacting end of the striking member is deeper in the earth than the second end of the hollow casing, the earth contacting end of the striking member substantially does not contact the second end of the hollow casing, and the striking end of the striking member is configured to be struck.

3. The apparatus for directionally generating seismic waves according to claim 1, wherein the spacing member comprises a damping element selected from the group consisting of an elastomeric spacer, a fluid filled elastomeric spacer, a foam spacer, and a spacer that includes rubber rollers.

4. The apparatus for directionally generating seismic waves according to claim 1, wherein the earth contacting end of the striking member is sized to pass through the hollow casing.

5. The apparatus for directionally generating seismic waves according to claim 1, further comprising a casing engaging structure on the earth contacting end of the striking member, the casing engaging structure sized to engage the second end of the hollow member to prevent the earth contacting end of the striking member from passing through the hollow casing.

6. The apparatus for directionally generating seismic waves according to claim 5, wherein the casing engaging structure includes a flange on the second end of the striking member, the flange extending towards the hollow casing and sized to fit around the exterior of the hollow casing.

7. The apparatus for directionally generating seismic waves according to claim 5, wherein the casing engaging structure centers the earth contacting end of the striking member with respect to the second end of the hollow casing when the earth contacting end of the striking member is drawn into contact with the second end of the hollow casing.

8. The apparatus for directionally generating seismic waves according to claim 1, wherein the spacing member is attached to the shaft of the striking member; and
    further comprising a sliding interface between the hollow casing and the spacing member, wherein the sliding interface comprises a low friction material on the hollow casing.

9. The apparatus for directionally generating seismic waves according to claim 1, wherein the spacing member is attached to the hollow casing; and
    further comprising a sliding interface between the spacing member and the striking member, wherein the sliding interface comprises a low friction material on the striking member.

10. The apparatus for directionally generating seismic waves according to claim 1, further comprising a pile driving cap, wherein the pile driving cap is secured to the striking member.

11. The apparatus for directionally generating seismic waves according to claim 1, further comprising a driving device releasably attached to the first end of the hollow casing, the driving device substantially protecting the striking end of the shaft from being impacted.

12. The apparatus for directionally generating seismic waves according to claim 1, further comprising:
    a first flange attached to the hollow casing proximate the first end,
    a second flange attached to the hollow casing proximate the first end; and
    a carriage, the carriage including:
        a base;
        a first arm attached to the base and extending away from the base;
        a second arm attached to the base and extending away from the base, where the first and second arms are attached to the same side of the base;
        a first clamp assembly attached to the first arm distal from the base, the first clamp assembly configured to grip the first flange;
        a second clamp assembly attached to the second arm distal from the base, the second clamp assembly configured to grip the second flange; and
        a third clamp attached to the base, the third clamp configured to grip the striking end of the striking member.

13. A method for generating seismic waves comprising:
    placing an end of an elongate hollow casing on the earth's surface;
    driving at least a portion of the hollow casing into the earth;
    creating a drilled depth by removing a column of earth wherein the column of earth removed is longer than the portion of the hollow casing driven into the earth;
    passing through the hollow casing a striking member having a shaft, an earth engaging end, and an end of the striking member configured to be struck and placing the earth engaging end into the drilled depth; and generating seismic waves with relatively strong longitudinal energy and relatively weak transverse energy by impacting the end of the striking member configured to be struck and driving the striking member into the earth.

14. The method for generating seismic waves according to claim 13, further comprising sweeping the inside of the hollow casing before passing through the hollow casing a striking member.

15. The method for generating seismic waves according to claim 13, further comprising applying a friction reducing layer to the inside of the hollow casing before passing through the hollow casing a striking member.

16. The method for generating seismic waves according to claim 13, further comprising maintaining a spaced relationship between the striking member and the hollow casing using a spacer that contacts the striking member and the hollow casing.

17. The method for generating seismic waves according to claim 16, further comprising using the spacer that contacts the striking member and the hollow casing to damp vibrations generated by driving the striking member into the earth.

18. A method for generating seismic waves comprising:

placing on the earth's surface a seismic wave generating device having a casing, a striking member including a shaft extending through the casing with an end of the striking member protruding past and contacting an end of the casing and an opposing end of the striking member protruding past an opposing end of the casing, and a spacing member maintaining a spaced relationship between the casing and the shaft of the striking member;

driving the seismic wave generating device into the earth;

driving the striking member further into the earth to separate the end of the striking member that contacts an end of the casing from the casing; and driving the striking member further into the earth than the casing after separating the striking member from the casing to generate seismic waves with relatively strong longitudinal energy and relatively weak transverse energy.

19. The method for generating seismic waves according to claim 18, wherein the step of driving the seismic wave generating device into the earth comprises imparting a driving force to the casing which in turn imparts at least a portion of the driving force to the striking member and thus drives both the casing and the striking member into the earth.

20. The method for generating seismic waves according to claim 18, further comprising using the spacer that maintains a spaced relationship between the casing and the shaft of the striking member to damp vibrations generated by driving the striking member into the earth.

* * * * *